United States Patent [19]
Ng

[11] Patent Number: 6,029,230
[45] Date of Patent: *Feb. 22, 2000

[54] DATA STORAGE LIBRARY WITH MEDIA DESTAGING AND PRESTAGING FOR IMPROVED RESPONSE TIME

[75] Inventor: Spencer Wah-Fung Ng, San Jose, Calif.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/734,943

[22] Filed: Oct. 22, 1996

[51] Int. Cl.$^7$ ..................................................... G06F 12/00
[52] U.S. Cl. ............................... 711/159; 711/4; 711/158; 714/15
[58] Field of Search ............................ 395/200, 33, 440, 395/620, 444, 828, 438; 711/159, 4, 158; 364/478.06

[56] References Cited

U.S. PATENT DOCUMENTS

| | | | |
|---|---|---|---|
| 4,614,474 | 9/1986 | Sudo | 414/281 |
| 4,636,946 | 1/1987 | Hartung et al. | 395/440 |
| 4,654,727 | 3/1987 | Blum et al. | 360/71 |
| 4,766,581 | 8/1988 | Korn et al. | 369/30 |
| 4,945,428 | 7/1990 | Waldo | 360/92 |
| 4,987,533 | 1/1991 | Clark et al. | 395/620 |
| 5,140,683 | 8/1992 | Gallo et al. | 395/444 |
| 5,197,055 | 3/1993 | Hartung et al. | 369/34 |
| 5,239,650 | 8/1993 | Hartung et al. | 395/828 |
| 5,287,459 | 2/1994 | Gniewek | 395/438 |
| 5,336,030 | 8/1994 | Ostwald et al. | 414/277 |
| 5,367,698 | 11/1994 | Webber et al. | 395/200.33 |
| 5,377,121 | 12/1994 | Dimitri et al. | 364/478.06 |
| 5,395,199 | 3/1995 | Day, III et al. | 414/267 |
| 5,418,664 | 5/1995 | Ostwald | 360/92 |
| 5,423,018 | 6/1995 | Dang et al. | 395/486 |
| 5,495,371 | 2/1996 | Munemoto et al. | 360/71 |
| 5,497,457 | 3/1996 | Ford | 395/182.04 |
| 5,598,385 | 1/1997 | Mizukami et al. | 369/36 |

FOREIGN PATENT DOCUMENTS

| | | | |
|---|---|---|---|
| 1-220171 | 9/1989 | Japan | G11B 15/68 |
| 2-281319 | 11/1990 | Japan | G06F 3/06 |
| 7-153166 | 6/1995 | Japan | G11B 17/22 |
| 7-160438 | 6/1995 | Japan | G06F 3/06 |
| 7-230661 | 8/1995 | Japan | G11B 17/22 |

*Primary Examiner*—John W. Cabeca
*Assistant Examiner*—Fred F. Tzeng
*Attorney, Agent, or Firm*—Khanh Q. Tran

[57] ABSTRACT

A method for improving the response time of a data storage library of removable media is disclosed. The library includes a media storage rack with multiple slots for storing data media, a storage drive for writing data to or reading data from one of the media, a picker for moving the media between the slots and the drive, and a destage slot physically close to the drive. The method comprises the steps of: moving a first medium from the drive to the destage slot, the first medium being one that was last accessed by the drive; moving a second medium from a slot holding the second medium to the drive, the second medium being the medium that will be accessed next by the drive; during the operation of the drive on the second medium, returning the first medium from the destage slot to the slot originally holding the first medium; and positioning the picker close to the drive. In another embodiment of the invention, the library additionally includes a prestage slot. The step of returning the first medium, while the drive is accessing the second medium, includes the step of moving a third medium from the storage rack to the prestage slot. The third medium being one that will be accessed by the drive, following the second medium.

16 Claims, 11 Drawing Sheets

DATA STORAGE LIBRARY WITH MEDIA DESTAGING AND PRESTAGING FOR IMPROVED RESPONSE TIME

FIELD OF THE INVENTION

The present invention relates to data storage libraries of removable media, such as optical disks and tape cartridges, and in particular to a method and system for improving the response time of a storage library in accessing its data media.

BACKGROUND OF THE INVENTION

Figure 1:
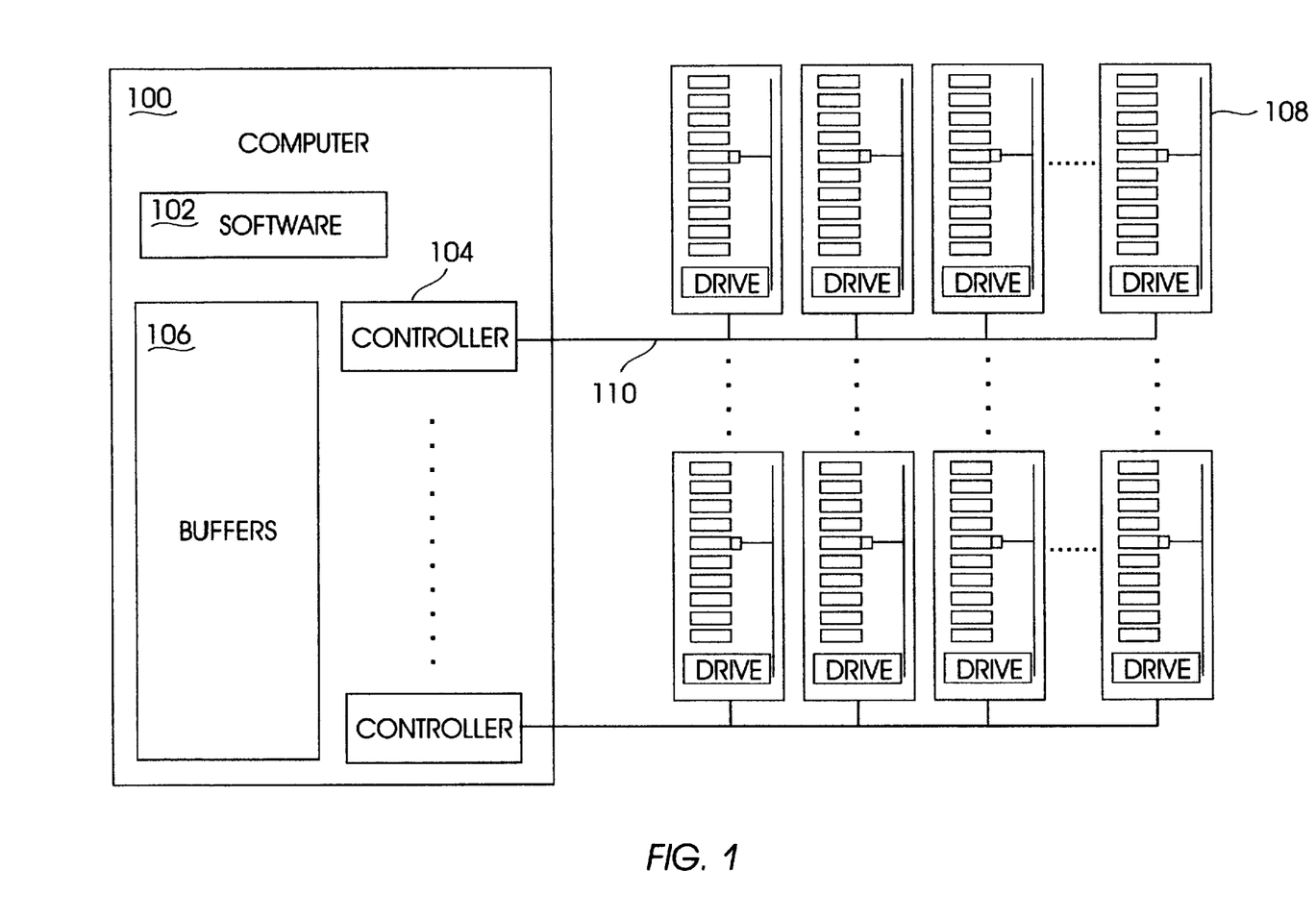
FIG. 1 is a block diagram of a host computer system attached to multiple data storage library systems.

An automated storage library is a computer data storage device capable of mounting units of storage media (e.g., disks or tape cartridges) on a drive in response to access requests from a host computer system. The diagram of FIG. 1 illustrates a typical computer configuration in which a host computer system 100 is attached to multiple storage libraries 108. The computer 100 includes buffers 106 stored in main memory or on nonvolatile secondary storage devices (e.g., fixed disks) and one or more interface controllers 104. Each controller 104 is attached to one or more data storage libraries 108 by an interface bus 110. The buffers 106 store the results of recent library access requests so that some future requests can be resolved without accessing the libraries. Some buffers 106 are also used to reorganize data as it moves between the array of libraries and the computer 100. Computer software 102 runs on the computer 100 and accepts access requests for a storage device and translates those requests into one or more access requests to a library in the system. The requests for data in a library are typically put into a queue accessible by the library, its controller, the host, or any combination of them depending on the computer configuration.

A data storage library 108 usually includes a set of removable data media, one or more storage drives capable of writing data to or reading data from the media, a storage rack for storing the media when they are not in use, and a robot picker mechanism (possibly more than one) for moving the media between the storage rack and the drives. The storage rack typically has multiple slots or cells, each holding a data medium. Each data medium may be contained in a cassette or cartridge housing for easier handling by the picker. The picker operates on command to transfer the data media between the storage slots and the storage drives without manual assistance. Once a data medium is loaded (or mounted) in a drive, data may be written to or read out from that medium for as long as the host system so requires. Libraries range in physical size from that of a room containing 1,000 or more media units to a desk top unit containing as few as 8 media units. The storage capacity of the largest library systems is in the terabyte range, while the smallest libraries may have capacities of only 1 gigabyte.

Several automated storage libraries are known. IBM Corporation introduced the 3850 Mass Storage System for the storage and retrieval of magnetic modules in the 1970's. More recently, several firms have introduced automated storage libraries for magnetic tape cartridges and optical disks. For instance, magnetic tape cartridge libraries are described in U.S. Pat. No. 4,654,727, while optical disk libraries are described in U.S. Pat. Nos. 4,614,474 and 4,766,581. The robotic picker mechanisms of these libraries include one or more grippers, each gripper capable of handling one or more storage media at a time. The '474 patent discloses a robotic picker having a single gripper, while the '727 and '581 patents disclose robotic pickers having multiple grippers.

Figure 2:
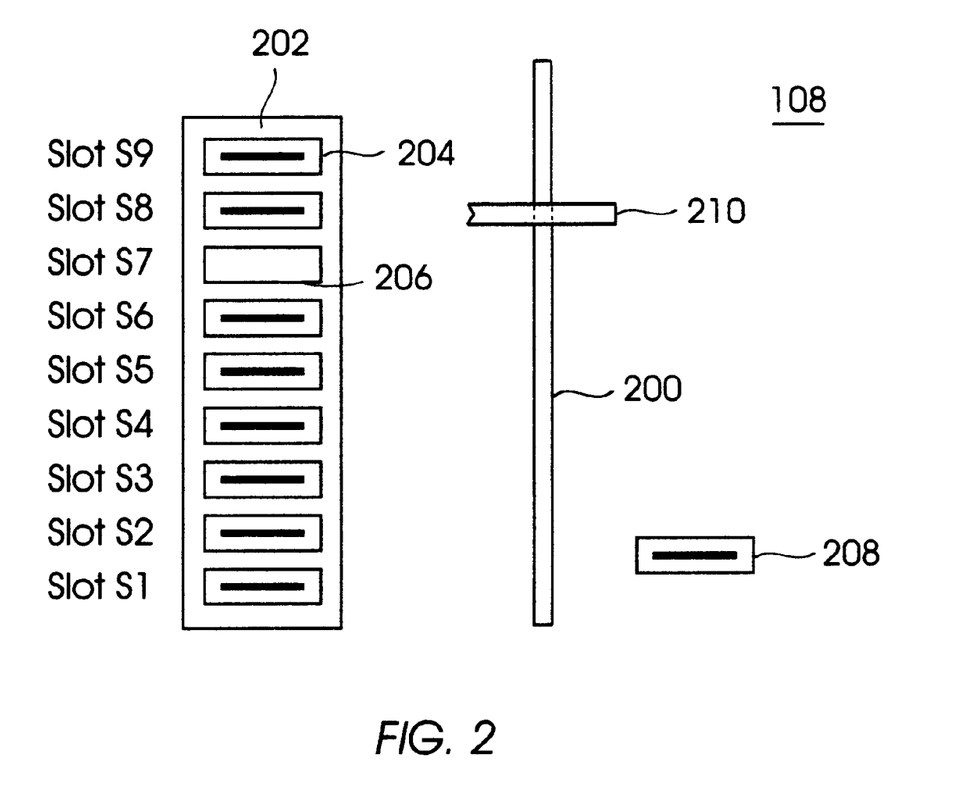
FIG. 2 is a block diagram of a prior art library system having a fixed storage rack with multiple slots, multiple removable data media, a fixed drive, and a picker for moving the media between the storage slots and the drive.

FIG. 2 is a block diagram of a simple prior art library system 108 having a fixed storage rack 202, a fixed drive 208, and a movable picker 210. The storage rack 202 has multiple slots (or cells) 204 for storing the removable media 206 when the media are not in use, each of the slots 204 holding a medium. In FIG. 2, the rack 202 is shown as having nine slots 204, designated as slots S1 through S9. The slot S7 is empty because its medium has been moved by picker 210 to the drive 208. In an actual storage library, there may be multiple racks 202 and the number of slots 204 in each rack 202 may be much higher. The picker 210 is movable by a transport mechanism 200 for shuttling the media 206 between the storage slots 204 and the drive 208.

Figure 3:
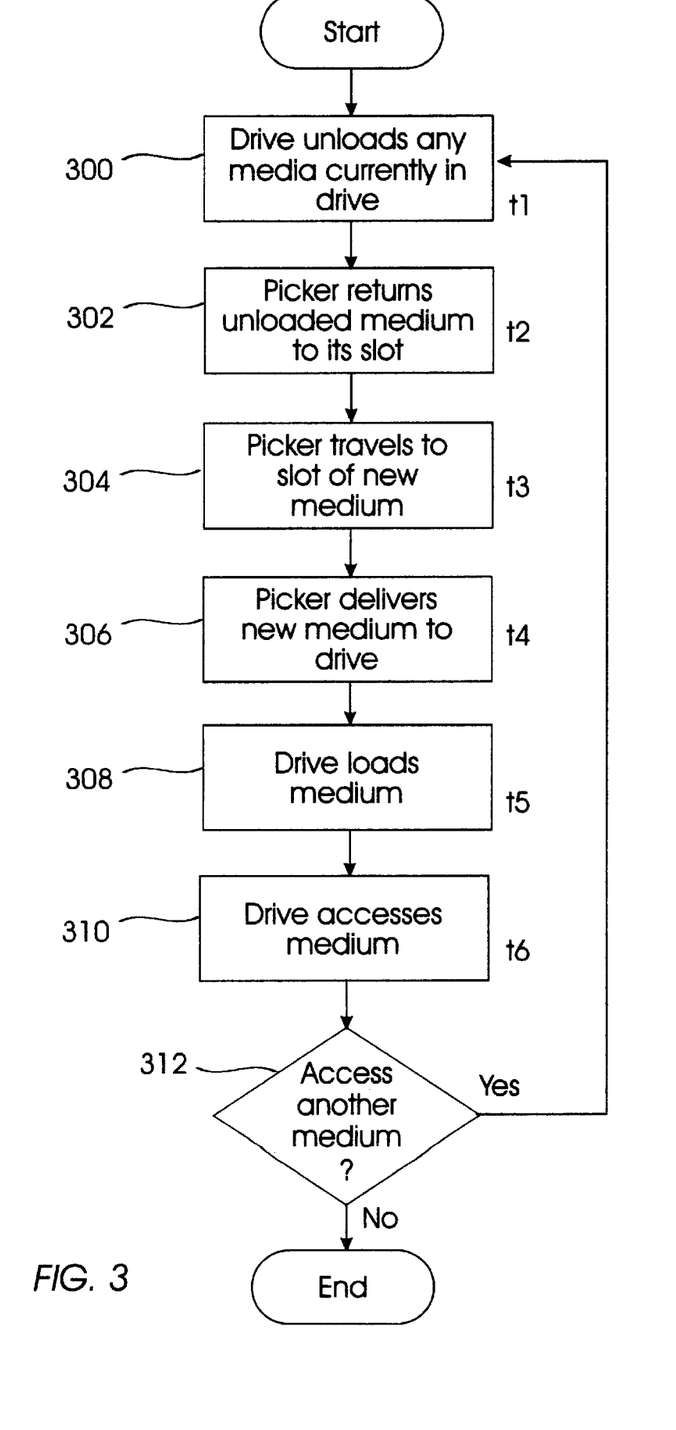
FIG. 3 is a flow chart representing the operation of library system of FIG. 2, in servicing requests from the host computer to access the data media of the library system.

FIG. 3 is a flow chart showing the main tasks performed by the library 108 in servicing a host request for accessing a data medium in the library. At step 300, drive 208 unloads (or demounts) any medium 206 currently in the drive. Normally, this is the medium that was last accessed by drive 208. At step 302, picker 210 returns the unloaded medium 206 to its original slot 204 in rack 202. The picker 210 then travels to a slot in rack 202 where another medium 206, which will be accessed next by drive 208, is stored, as shown by step 304. In the library system of FIG. 2, this would be slot S7 before its medium was moved to drive 208. In step 306, the picker 210 delivers the medium from slot S7 to drive 208. Drive 208 then loads and accesses the new medium in steps 308 and 310, respectively. If another data medium is to be accessed by drive 208 after the medium from slot S7, as determined by step 312, the steps of FIG. 3 are repeated starting with step 300, where drive 208 would unload the medium currently in the drive. The unloaded medium is then returned to its original slot in rack 202, which is slot S7 in this case, according to step 302.

Figure 4:
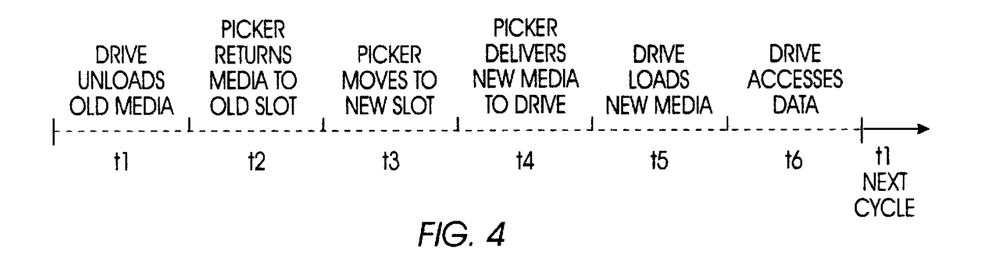
FIG. 4 is a time line showing the chronology of activities of the storage library of FIG. 2, in servicing a host request for accessing the data media, according to the prior art method of FIG. 3.

FIG. 4 is a time line showing a chronology of activities of the library 108 in servicing a request from the host computer 100, for accessing a data medium 206. Assuming the medium 206 has not been loaded by drive 208, the response time of the library is the sum of the time for drive 208 to unload the medium 206 currently in the drive (t1), time for picker 210 to return the unloaded medium 206 to its original slot 204 (t2), time for picker 210 to travel to a slot in rack 202 to pick up the next medium (t3), time for picker 210 to move the new medium from its slot to drive 208 (t4), time for drive 208 to load the new medium (t5), and time for drive 208 to access the media (t6).

For tape storage media, once a tape medium 206 is delivered to drive 208, it is also necessary to mount the tape cartridge, read its table-of-contents (TOC), and fast-forward the tape until the desired record on the tape is reached. These actions, which are part of the time period t5 of FIG. 4, for loading the medium 206, typically take minutes to complete. For disk storage media, the loading time is shorter because the disk media can be randomly accessed for writing data to or reading data from the disk. However, once the disk medium is delivered to drive 208, it is still necessary to spin the disk up to a desired speed, during time t5, before the disk is accessed. Similarly, during time t1 when drive 208 is unloading the medium, it is necessary to spin down the just accessed disk medium before it can be removed from drive 208. Still, the typical time a disk medium is in the drive 208 while it is being loaded, accessed, and unloaded by the drive is at least tens of seconds. In prior art library systems, the picker 210 is typically idle during this time period while waiting for the drive 208 to finish its operations on the medium. Since the picker 210 cannot start its tasks of putting away the last accessed medium and fetching the next medium until the drive 208 completes its operations, the picker idle time unnecessarily adds the total response time of the library.

Furthermore, as shown by the library of FIG. 2, the time required for the picker 210 to travel between a slot in the storage rack 202 and the drive 208 greatly depends on the location of the slot relative to the drive. It takes less time for the picker 210 to move to drive 208 from a slot physically closer to the drive 208 than one further away from the drive. For example, it would take less time for the picker 210 to move to drive 208 from slot S2 than from slot S6. Because of the typically large number of slots 204 in an actual storage rack 202, this time difference can be quite significant. Also, as illustrated by FIG. 4, the total library response time includes the time for the picker to return the previously accessed medium to its slot (t2), time to travel to the slot holding the new medium (t3), and time to deliver the new medium to the drive (t4). The response time thus heavily depends on the relative locations of the drive 208, the old media slot, and the new media slot. If these two slots are arranged such that they are physically close to each other and also close to the drive, the time components t2, t3, and t4 of FIG. 2 can be greatly minimized, thus reducing the total library response time.

In the assignee's U.S. Pat. No. 5,287,459 for "Method and Apparatus For Reducing Response Time In Automated Library Data Retrieval Systems," a method is disclosed for improving the access time in an automated storage library by creating multiple copies of data on different recording media cartridges. The original data and its copies are stored in different areas of the library, where the number of copies and their residence times depend on the usage of the original data and any copies. A library manager selects the media cartridge that can be retrieved in the shortest time based on the location of the original and the copies, the location of the requested data on each cartridge, and the availability of the drive and the picker.

This method, however, substantially reduces the storage capacity of the library because the same data is stored in numerous copies in the library, in addition to statistics on the usage of the original data and its copies. The performance of the whole computer system is also degraded due to the multiple write operations the system must perform for each data item. Furthermore, the operation of the library requires a sophisticated library manager which, among other tasks, collects usage information on each item of data such as its location in the library cartridges and the number of copies and their locations, determines the residence times of the copies, and selects the appropriate cartridge to be retrieved. The library manager thus adds significant complexity to the library system.

Another method for improving the response time in a storage library is described in the assignee's U.S. Pat. 5,197,055 for "Idle Demount In An Automated Storage Library." In this method, whenever one or more occupied storage drives of the library remain inactive for a predetermined relatively long time, their media are demounted before these drives are actually needed for the next media. Such a method of advanced media demount, however, imposes a severe performance penalty to the system since it needs to continuously monitor all the storage devices and determines whether to demount a medium based on the length of time the respective device has been idle. Also, the method does not work well if the library is busy most of the time.

In the U.S. Pat. No. 5,418,664, a storage library is described which includes a tray capable of holding multiple storage media cartridges and attached to an a robotic indexing hand of the library. The tray is used to store the media cartridges for improving the performance of the media exchange operations. Such a library, however, adds complexity to the picker design and is cumbersome in operation since the whole tray is moved together with the picker up and down the storage rack.

Still other methods have been proposed for improving the response times of storage libraries having a hierarchy of different storage devices, where the devices have different access times and capacities. For instance, data may be staged or destaged at different levels of the storage hierarchy, depending on certain predetermined criteria on the data. As an example of staging, data in a library may be prioritized based on the likelihood of being used by the host computer in the near future, wherein the data that is most likely to be requested next by the host system is moved to the level of storage devices having the shortest access time. Similarly, in the case of data destaging, the least likely used data is off-loaded to the storage level with the longest access time. An example of such methods is described in U.S. Pat. No. 4,636,946. Data staging or destaging may also be based on the age of the data, rather than the likelihood of use, such as the method described in U.S. Pat. No. 4,987,533.

The above data staging and destaging techniques, however, result in an improvement in the response time only when the libraries include several types of storage devices with significantly different access times. Furthermore, the methods typically require the constant supervision of a library manager for moving data back and forth among the various levels of the storage hierarchy, based on constantly changing parameters such as the age and usage of the data. Lastly, since the amount of data being moved in the destaging is usually larger than the amount of data processed by the host processor, the processor may be tied up during long series of destaging operations, thus degrading the performance of the whole computer system.

Therefore, there remains a need for a simple method for destaging and prestaging the library media that allows concurrent operation of the picker and the drive, and does not require a complex library management system, reduce the storage capacity of the library due to the duplication of data, or impose a performance penalty on the host computer because of storage device management tasks.

SUMMARY OF THE INVENTION

The present invention is a data storage library of removable media with means for destaging and prestaging the media, and a method for improving the response time of the library by destaging and prestaging the media concurrently with the operation of the drive. In a preferred embodiment of the invention, the library comprises a media storage rack with multiple slots for storing the data media, at least one storage drive for writing data to or reading data from one of the media, a picker for moving the media between the slots and the drive, and a destage slot. The destage slot allows the fast off-loading of the previously accessed medium from the drive to minimize the drive idle time, and preferably, is physically closest to the drive to minimize its travel time.

In accordance with the invention, the picker moves a first medium from the drive to the destage slot, the first medium being the medium that was last accessed by the drive. The picker moves a second medium from a slot of the storage rack to the drive, the second medium being one that will be accessed next by the drive, after the first medium. While the drive is accessing the second medium, the picker returns the first medium from the destage slot to the slot that originally held the first medium, in the storage rack. The picker then positions itself next to the drive to be ready for destaging the second medium in the next iteration of the method steps.

In another preferred embodiment of the invention, the library additionally includes a prestage slot to allow a third medium, which will be accessed next by the drive after the second medium, to be staged near the drive while the drive is busy accessing the second medium. Preferably, the prestage slot is the second closest to the drive to minimize the time it takes for the picker to subsequently move the third medium to the drive. In accordance with the method of the invention, the step of returning the first medium also includes the step of moving the third medium from its slot in the storage rack to the prestage slot. The method steps are repeated with the second and the third medium in the last iteration becoming, respectively, the first and second media in the next iteration.

Additional objects and advantages of the present invention will be set forth in the description which follows, and in part will be obvious from the description and with the accompanying drawing, or may be learned from the practice of this invention.

DESCRIPTION OF THE PREFERRED EMBODIMENT

Figure 5:
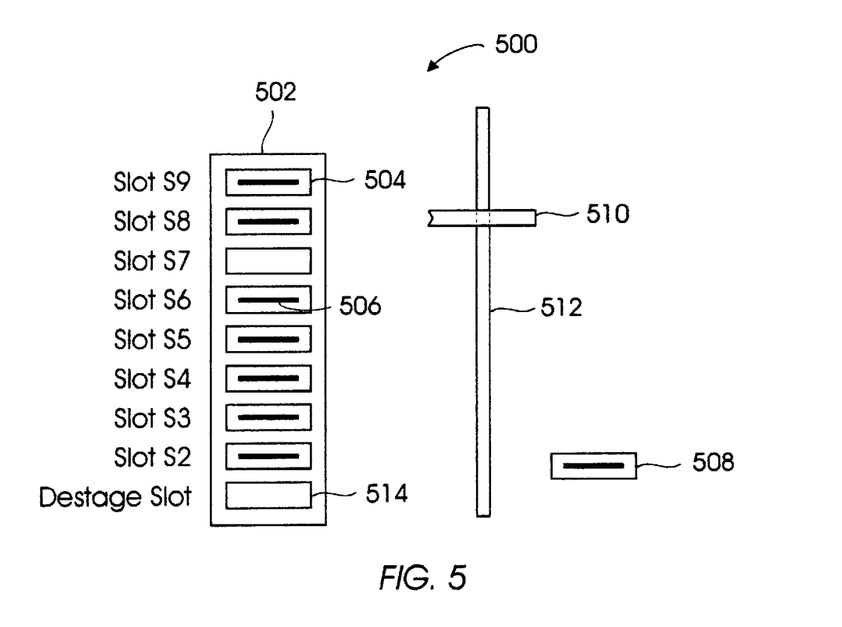
FIG. 5 is a block diagram of a storage library having a destage slot and a fixed home slot for each medium to return to, in accordance with the first preferred embodiment of the invention.

A data storage library according to the invention will now be described with reference to FIG. 5. The library 500 comprises a media storage rack 502 having multiple slots 504 for storing data media 506, a storage drive 508 for writing data to or reading data from one of the media 506, a picker mechanism 510, and a destage slot 514. Preferably, the destage slot is the slot in rack 502 that is physically closest to drive 508. The picker 510 is movable by a transport mechanism 512 for shuttling the media 506 between the storage slots 504 and drive 508. FIG. 5 shows a preferred embodiment of the invention in which the storage slot S1 of rack 502, which is physically closest to drive 508, is used as the destage slot 514. In such a configuration, where each medium is assigned a permanent home slot, the capacity of the storage rack 502 is reduced by one slot. Alternatively, an additional storage slot close to the drive 508 may be provided and designated as the destage slot 514 to avoid reducing the rack capacity. In either case, the destage slot 514 allows a medium previously accessed by the drive 508 to be quickly off-loaded from the drive and temporarily held in the destage slot, while the picker 510 retrieves a new medium and delivers the new medium to drive 508.

Figure 6:
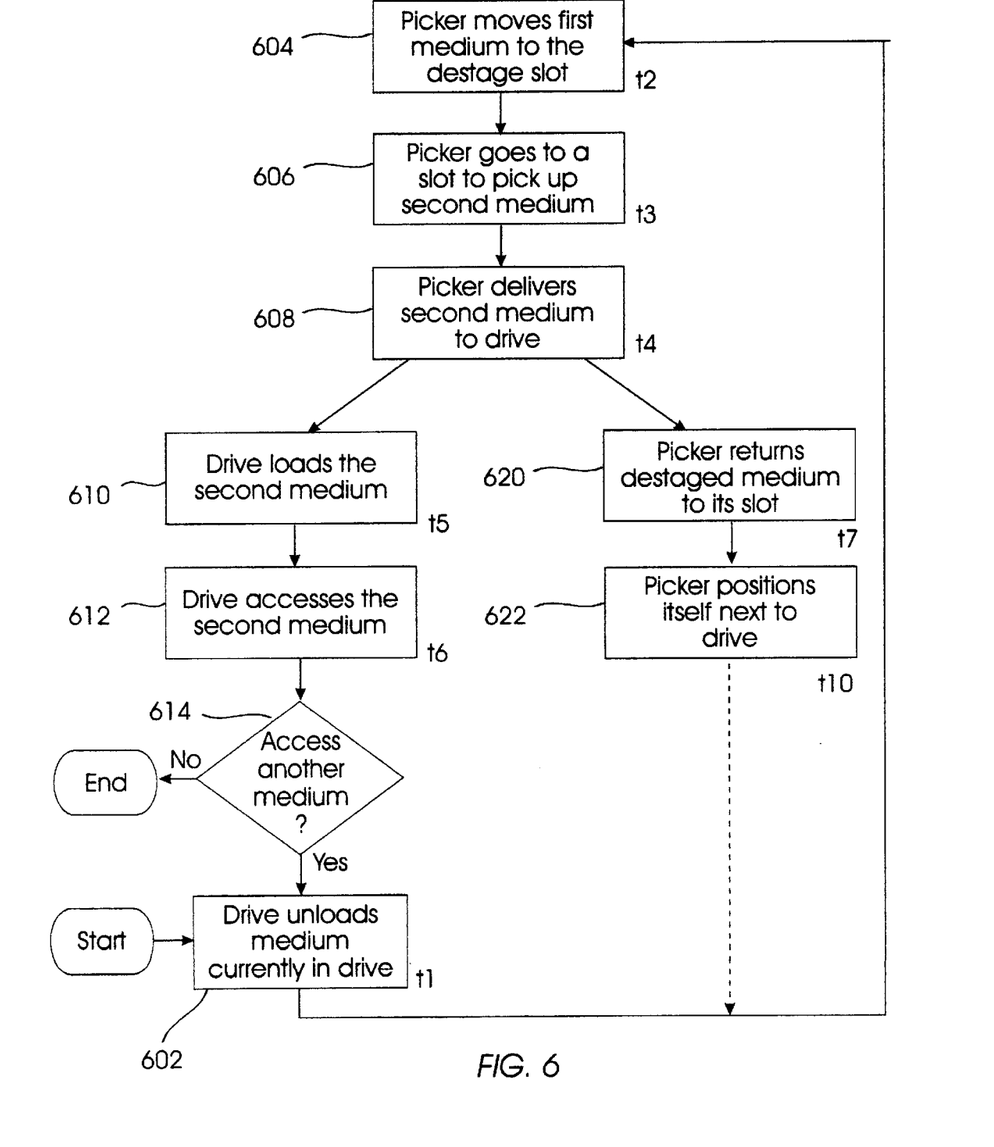
FIG. 6 is a flow chart representing the operation of the destaging method, in accordance with the invention, as applied to the library system of FIG. 5 in servicing a media access request from the host computer.

FIG. 6 is a high-level flow chart showing the main steps performed by the library of FIG. 5 in servicing a host request for media access, in accordance with the method of the present invention. Starting with step 602, the drive 508 unloads any medium currently in the drive (the first medium). Normally, this would be the medium that was last accessed by the drive. In step 604, the picker 510 moves the unloaded medium to the destage slot 514. Since the destage slot 514 is the slot in rack 502 that is closest to drive 508, the picker 510 only need to travel the shortest possible distance and can off-load the unloaded medium in the least possible amount of time. This time period is generally much less than the corresponding time component t2 of FIG. 4, for prior art methods. In step 606, the picker 510 travels to a slot in rack 502 to pick up a new medium (designated as the second medium), which is to be accessed next by drive 508, and delivers the second medium to the drive in step 608.

Following step 608, the activities of the drive 508 and picker 510 take place concurrently and are shown respectively by the left and right branches of the flow chart. In steps 610 and 612 of the left branch, drive 508 loads and accesses the second medium, respectively. If another medium is to be accessed, as determined in step 614, the above-described steps of FIG. 6 are executed again starting with step 602, for unloading the medium currently in drive 508. The second medium in the current cycle becomes the first medium in the next cycle. In parallel with the drive operations performed in steps 610, 612, and 602, the picker 510 returns the first medium, currently in the destage slot 514, to the slot in rack 502 that originally contained this medium, as shown by step 620 of the right branch. Also, the picker 510 positions itself next to drive 508, in step 622, to be ready for destaging the second medium from drive 508 in the next iteration of the method steps.

Figure 7:
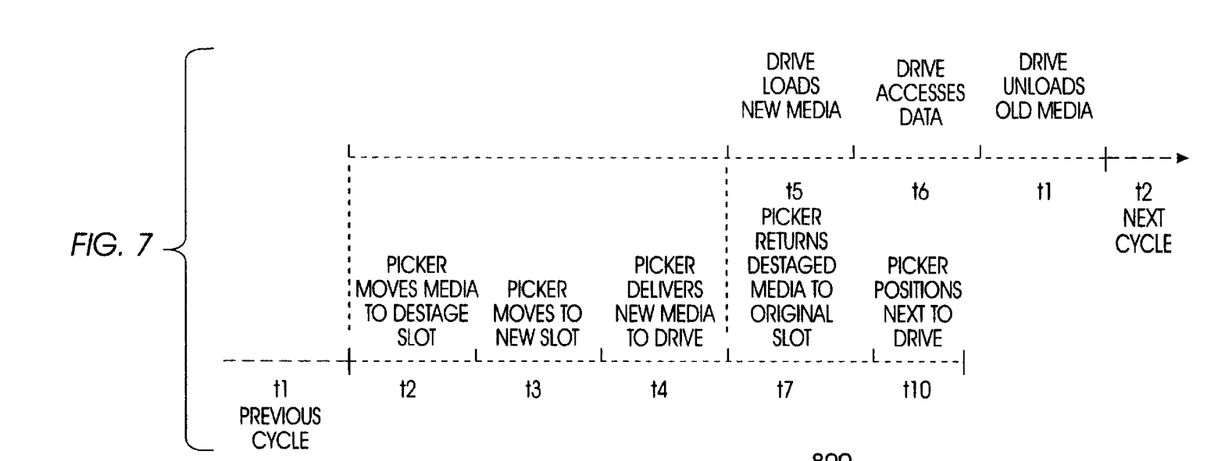
FIG. 7 is a time line showing the chronology of activities of the storage library with a destage slot of FIG. 5, in performing the media destaging method represented by the flow chart of FIG. 6.

FIG. 7 is a time line showing the chronology of activities of the library system 500 in handling a request from the host system to access a data medium in the library. The library response time is the sum of time periods t2, t3, t4, t5, t6 and t1. During time t2, the picker 510 off-loads any medium currently in drive 508 to the destage slot 514. Since the destage slot 514 is in close proximity to drive 508, this time t2 is generally smaller than the time t2 of FIG. 4, for prior art methods. During time t3, the picker 510 travels to a slot in rack 502 to pick up the second medium, which will be accessed next by drive 508. The picker 510 then retrieves the second medium from its slot and delivers it to the drive 508 in time t4. During time periods t5 and t6, the drive 508 loads and accesses the second medium, respectively. Finally, the drive 508 unloads the second medium, in time t1, and the cycle repeats.

The time periods t7 and t10, during which the picker 510 moves the previously accessed medium (the first medium) from the destage slot 514 to its original slot in rack 502 and positions itself next to the drive 508, respectively, do not add to the total response time of the library. These tasks are performed concurrently with drive operations during time periods t5, t6, and t1, and typically can be completed during such periods.

Figure 8:
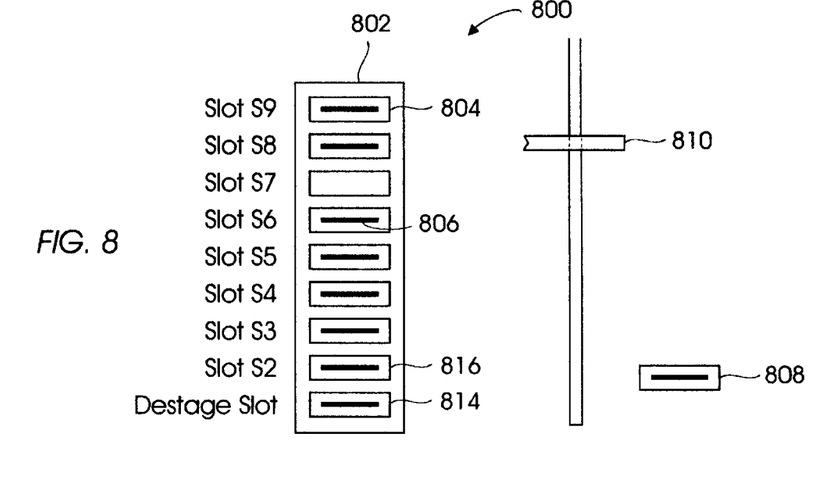
FIG. 8 is a block diagram of a storage library system having a destage slot, but each medium does not have a home slot to return to, in accordance with the second preferred embodiment of the invention.

In the previously described preferred embodiment, the capacity of the library of FIG. 5 was reduced by one storage medium because its slot was used as the media destage slot. That embodiment allows simplicity of library management by assigning a fixed permanent home slot for each medium in the library. In a second preferred embodiment of the invention, no reduction in the storage capacity is required and yet improvement in response time deriving from rapid destage can still be achieved. In this embodiment, each medium will not have a fixed home slot to always return to. Instead, the finished medium (the first medium) will be moved from the destage slot to wherever an empty slot, which was last occupied by the medium currently in use in the drive, happens to be. The library in which such a method is used would be the same as the one shown in FIG. 2, with slot S1 being permanently assigned as the destage slot, as shown in the library 800 of FIG. 8. A flow chart representing the operation of the second preferred embodiment of the method for media destaging is provided in FIG. 9.

Figure 9:
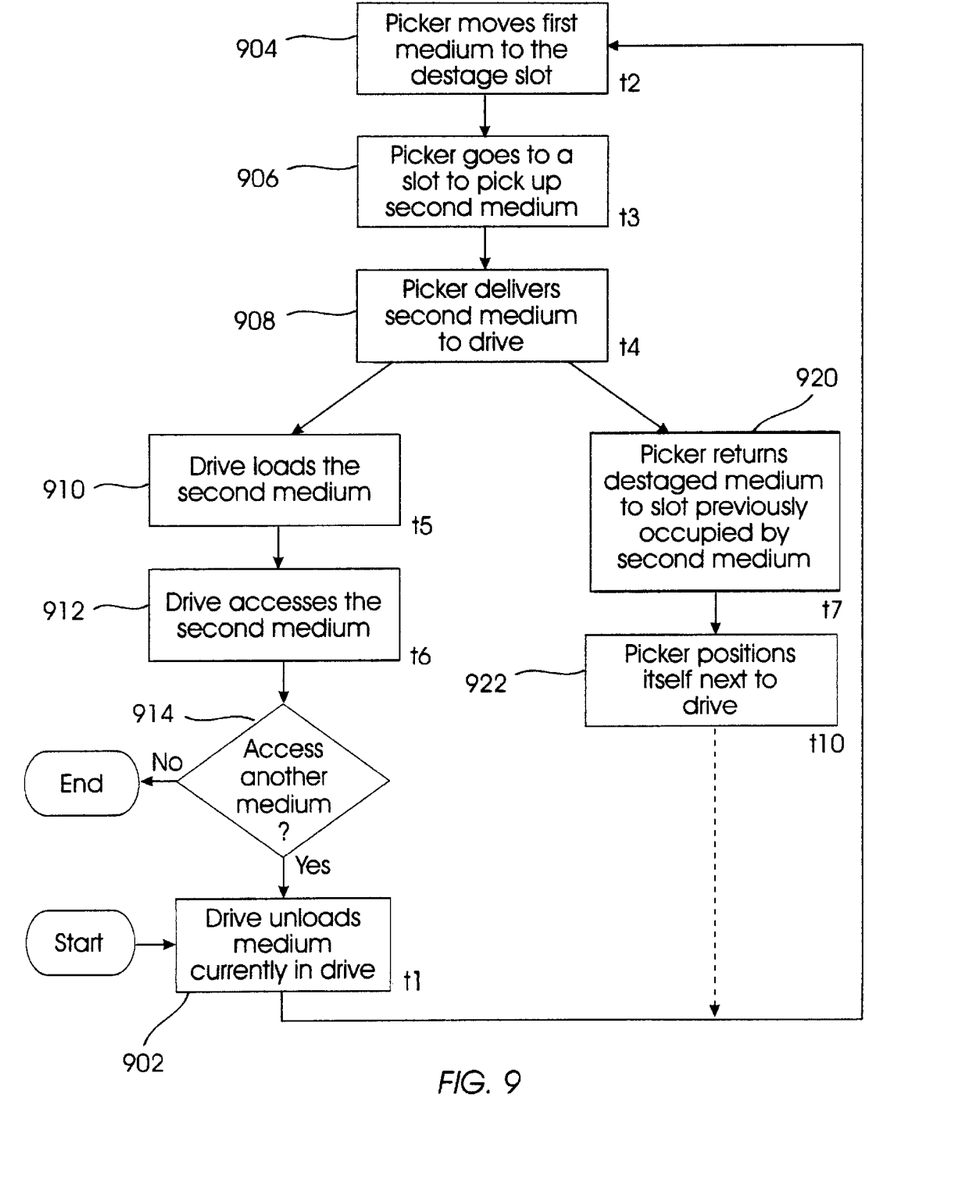
FIG. 9 is a flow chart representing the operation of the method of media destaging, in accordance with the invention, as applied to the library system of FIG. 8.

Starting at step 902, the drive 808 unloads any medium 806 currently in the drive. In step 904, the picker 810 moves the unloaded medium to the destage slot 814. Since the destage slot 814 is the slot in rack 802 that is nearest to drive 808, the picker 810 only need to travel the shortest possible distance. In steps 906 and 908, respectively, the picker 910 travels to one of the slots in rack 802 to pick up a second medium, which is to be accessed next by drive 808, and delivers the second medium to the drive.

Again, the concurrent activities of drive 808 and picker 810 are shown by the two branches of the flow chart. In steps 910 and 912 of the left branch, drive 808 loads and accesses the second medium, respectively. If a third medium is to be accessed by drive 808 after the second medium, as determined in step 914, the above described steps are repeated starting with step 902. The second and third medium of the current cycle become the first and second media, respectively. Also, in parallel with the drive operations in steps 910, 912, and 902, the picker 810 retrieves the first medium currently in the destage slot 814 and puts it into the free slot previously occupied by the second medium (now in drive 808), as shown by step 920 of the right branch of the flow chart. Finally, in step 922, the picker 810 positions itself next to drive 808. At this point, the destage slot 814 is the only empty slot in the library.

Figure 10:
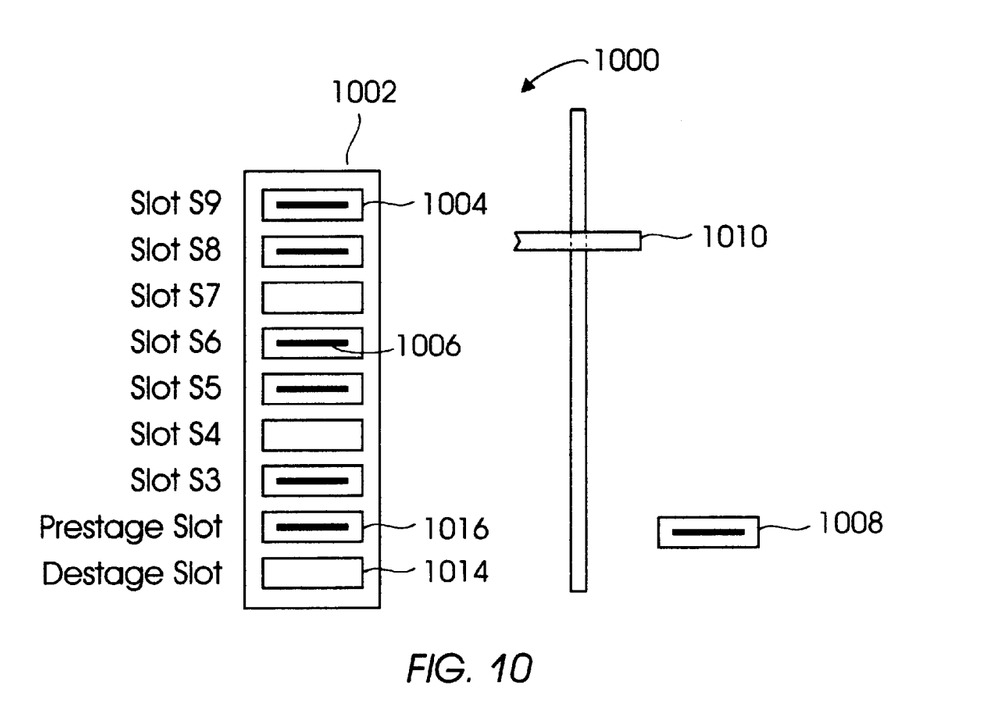
FIG. 10 is a block diagram of a storage library having a media destage slot, a media prestage slot, and a fixed home slot for each medium to return to, in accordance with the third preferred embodiment of the invention.

A third preferred embodiment of the invention is illustrated in FIG. 10 in which the storage library 1000 includes a prestage slot 1016 in addition to a destage slot 1014. Preferably, both the destage slot 1014 and prestage slot 1016 are as close to drive 1008 as possible to minimize the picker's travel time. As an example, in the storage library of FIG. 10, the slots S1 and S2 of rack 1002, which are the first and second physically closest slots to drive 1008, are designated as the destage slot 1014 and prestage slot 1016, respectively. In this configuration, where each medium is assigned a permanent home slot, the capacity of the storage rack 1002 is reduced by two slots. Alternatively, two additional storage slots may be provided close to the drive 1008 and designated as the destage and prestage slots to avoid reducing the rack capacity.

As in the storage library of FIG. 5, the destage slot 1014 provides a place for quickly off-loading a previously accessed medium (the first medium) and for temporarily holding the first medium, while the picker 1010 goes to retrieve a second medium and delivers the second medium to drive 1008. These operations are the same as those performed in time periods t3 and t4 for the prior art method of FIG. 4. The prestage slot 1016, however, is used for holding a third medium, which will be accessed following the second medium by drive 808, while drive 1008 loads, accesses, and eventually unloads the second medium. In FIG. 10, the prestage slot 1016 is shown as holding the medium from slot S4 which will next be accessed by drive 1008. The slot S7 is empty because its medium is being accessed by drive 1008. Since the prestage slot 1016 is located near the drive 1008, the picker 1010 will need to travel a relatively short distance to move the third medium to the drive, thus reducing the drive idle time.

Figure 11:
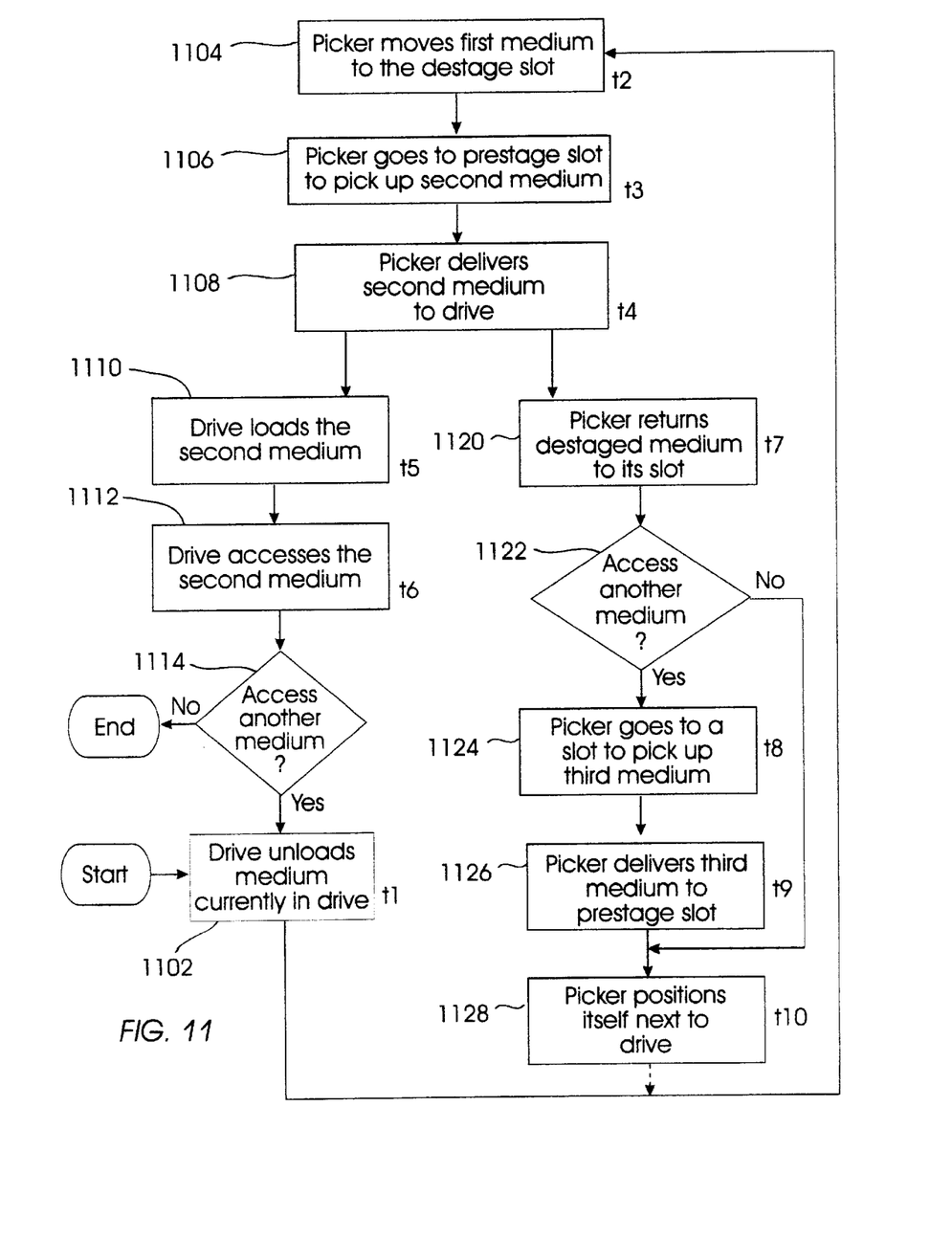
FIG. 11 is a flow chart representing the operation of the media destaging and prestaging method, in accordance with the invention, as applied to the library system of FIG. 10 in servicing a media access request from the host computer.

FIG. 11 is a flow chart showing the main steps performed by the library of FIG. 10, when it services a host computer request for accessing a medium in the library. Starting with step 1102, drive 1008 unloads any medium (designated as the first medium) currently in the drive. In step 1104, the picker 1010 moves the first medium to the destage slot 1014. Since the destage slot 1014 is preferably the slot in rack 1002 that is closest to drive 1008, the picker 1010 only has to travel the shortest possible distance. In steps 1106 and 1108, the picker 1010 travels to one of the slots in rack 1002 to pick up another medium, which is to be accessed next by drive 1008 and designated as the second medium, and delivers the second medium to the drive, respectively.

The left and right branches of the flow chart, following step 1108, represent concurrent operations of drive 1008 and picker 1010, respectively. In steps 1110 and 1112, drive 1008 loads and accesses the second medium, respectively. If a third medium is to be accessed following the second medium, as determined in step 1114, then once access of the second medium is completed, the drive 1008 unloads the second medium in step 1102. The method steps are repeated starting with step 1104, with the second and third media of the last cycle becoming the first and second media, respectively, in the new cycle. In parallel with the drive operations in steps 1110, 1112, and 1102, the picker 1010 continues with its operations, shown by steps 1120 through 1128 of the right branch. In step 1120, the picker 1010 returns the destaged first medium to its home slot in rack 1002. If there is no other access waiting in the library request queue, then the picker 1010 positions itself next to drive 1008 in step 1128. If there is another access request in the queue, then the picker 1010 travels to one of the rack slots to pick up a third medium, which will be accessed next by drive 1008, as shown by step 1124. The picker 1010 delivers the third medium to the prestage slot 1016 in step 1126, and positions itself next to drive 1008 in step 1128. Another iteration of the method steps is then performed, starting at step 1104.

Figure 12:
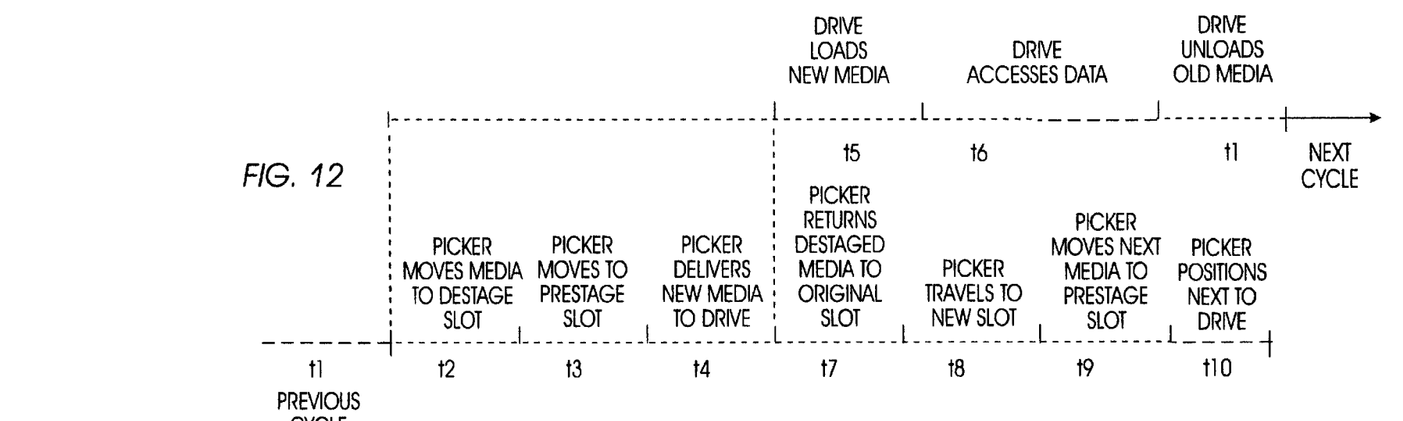
FIG. 12 is a time line showing the chronology of activities of the storage library with a destage slot and a prestage slot, in performing the media destaging and prestaging method represented by the flow chart of FIG. 11.

FIG. 12 is a time line showing the activities of the library 1000 in handling a request from the host system to access one of the library media. The library response time is the sum of the time t2 for the picker 1010 to move any medium currently in drive 1008 to the destage slot 1014 (generally small because of the proximity of the drive 1008 to the destage slot 1014), time t3 for the picker 1010 to move to the prestage slot 1016 to pick up the second medium, time t4 for the picker 1010 to deliver the second medium to drive 1008, time t5 for drive 1008 to load the second medium, time t6 for the drive to access the second medium, and time t1 for the drive to unload the second medium. Note that the picker 1010 returns the destaged first medium, retrieves the third medium, and positions next to the drive during time periods t7, t8, t9 and t10 in parallel with the loading, accessing, and unloading by drive 1008 during the time t5, t6, and t1. Thus, the time periods t7, t8, t9, and t10 do not add to the total response time of the library.

Unlike the prior art method of FIG. 4, the picker 1010 is not idle while drive 1008 is busy (time t5, t6, and t1), and drive 1008 is not subsequently idle while it waits for the picker 1010 to return the first medium to rack 1002 and fetch the third medium. Rather, the method of the present invention allows both the drive 1008 and the picker 1010 to perform their respective tasks concurrently. Thus, little time will be lost while drive 1008 waits for the third medium in the next iteration of the method steps since the third medium has been brought to the prestage slot, close to the drive. This task was performed by the picker while the drive was busy with the second medium and thus does not add to the response time. Also, little time was lost when the picker offloaded the first medium since it did not have to bring this medium back to its original slot, but only to the nearby destage slot. Later on, the picker 1010 can resume the task of returning the first medium to its original slot, while the drive 1008 performs media operations on the second medium. The proximity of the destage and prestage slots to the drive 1008 and to each other, together with the concurrent operations of the drive 1008 and the picker 1010, significantly shorten the overall response time of the library system.

In the third preferred embodiment of the invention described above, the capacity of the library of FIG. 10 is reduced by two media because their slots are used as the destage and prestage slots. That embodiment allows simplicity of library management by assigning a fixed permanent home slot for each medium in the library. In a fourth preferred embodiment of the invention, the library capacity will not be reduced for the destaging and prestaging purposes, yet reduction in response time deriving from prestage and rapid destage can still be achieved.

Figure 13:
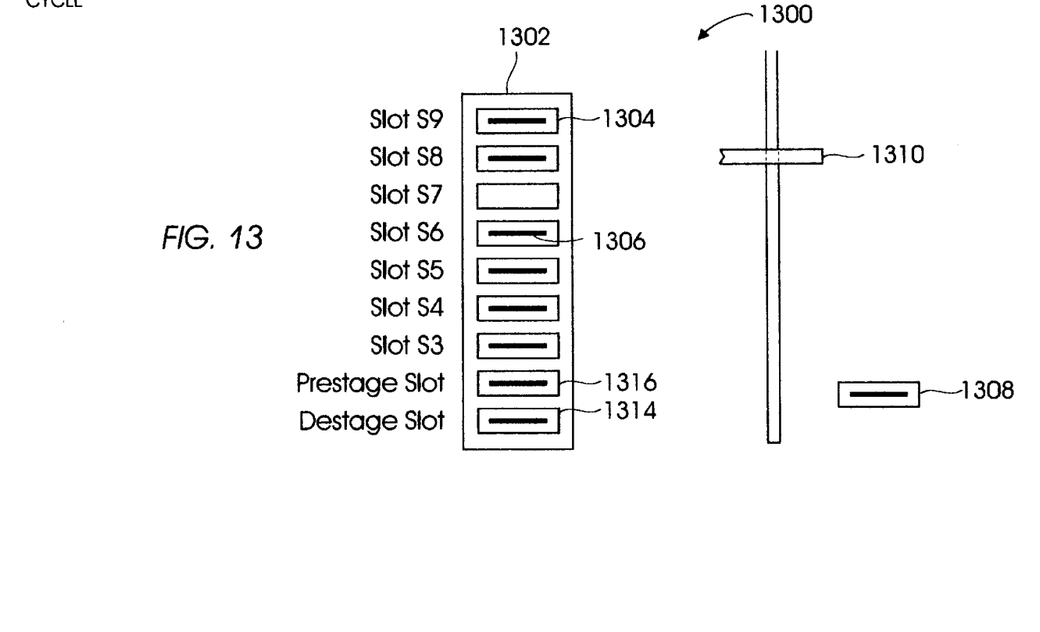
FIG. 13 is a block diagram of a storage library having a media destage slot and a media prestage slot, but each medium does not have a fixed home slot to return to, in accordance with the fourth preferred embodiment of the invention.
Figure 14:
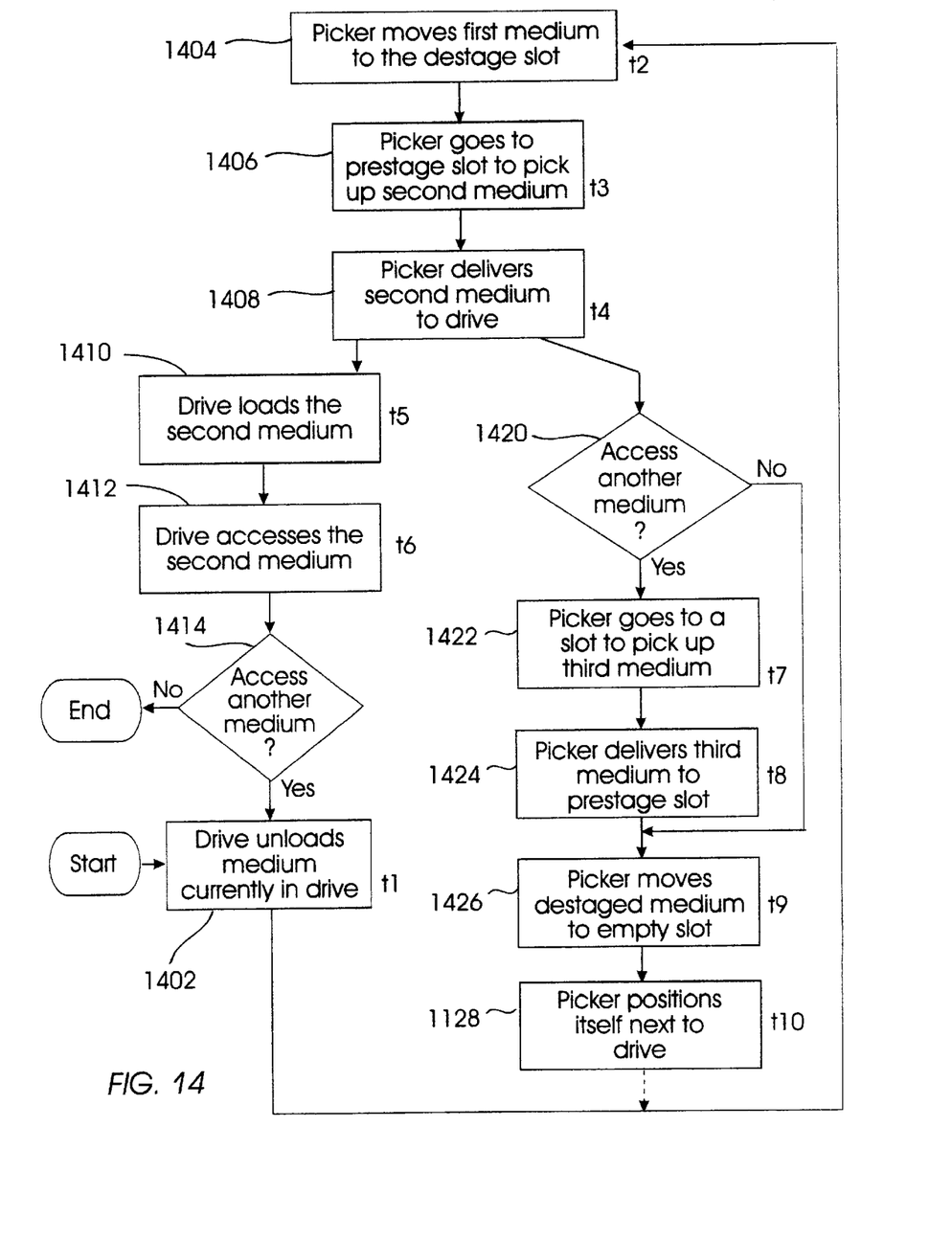
FIG. 14 is a flow chart representing the operation of the media destaging and prestaging method, in accordance with the invention, as applied to the library system of FIG. 13 in servicing a media access request from the host computer.

In accordance with the invention, the prestaging of the third medium will be done first, then the finished medium (the first medium) will be moved from the destage slot to wherever an empty slot, which is freed up by the prestaging of the third medium, happens to be. Thus, each medium will not have a fixed home slot to always return to. The library system in which such a method is used would be the same as the one shown in FIG. 2, with slot S1 being permanently assigned as the destage slot and slot S2 being permanently assigned as the prestage slot. Such a library system is shown in FIG. 13. The prestage slot 1316 holds the medium that will be accessed next by drive 1308, while the destage slot 1314 holds the last accessed medium, which will be returned to the slot previously occupied by the medium currently in the prestage slot. FIG. 14 is a flow chart representing the operation of this method of destaging and prestaging the media.

Starting at step 1402, the drive 1308 unloads any medium currently in the drive (the first medium). In step 1404, the picker 1310 moves the unloaded first medium to the destage slot 1314. In steps 1406 and 1408, the picker 1310 goes to the prestage slot 1316 to pick up the new (second) medium, which is to be accessed next by drive 1308, and delivers the new medium to the drive, respectively. The second medium has been prestaged in slot 1316 during the previous cycle of the method steps. The drive 1308 and picker 1310 then operate concurrently, as shown by the two branches following step 1408.

In steps 1410 and 1412 of the left branch, drive 1308 loads and accesses the second medium, respectively. If a third medium is to be accessed after the second medium, as determined by the library in step 1420 based on the request queue, then the method steps are repeated starting with step 1402 in which drive 1308 unloads the medium currently in the drive. The second and third media in the current cycle become, respectively, the first and second media in the new cycle.

In parallel with the drive operations of steps 1410,1412, and 1402, the picker 1310 continues with its operations in steps 1420 through 1428. If a third medium is needed after the second medium, as determined by step 1420, the picker 1308 travels to the slot holding this third medium in step 1422, and moves it to the prestage slot 1316, in step 1424. Next, in step 1426, the picker 1310 retrieves the first medium currently in the destage slot 1314 and puts it into the free slot previously occupied by the third medium. Finally, the picker 1310 positions itself next to the drive 1308 to be ready for destaging the second medium, which becomes the first medium, in the next iteration of the method steps. At this point, the destage slot 1314 is the only empty slot in the library.

Based on the foregoing specification, the invention may be implemented using computer programming or engineering techniques including computer software, firmware, hardware or any combination or subcombination thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

An apparatus for making, using, or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system or computer subsystem embodying the method of the invention.

While several preferred embodiments of the invention have been described, it should be apparent that modifications and adaptations to those embodiments may occur to persons skilled in the art without departing from the scope and the spirit of the present invention as set forth in the following claims.

What is claimed is:

1. A method for destaging and prestaging media in a storage library having a plurality of removable data media, a plurality of storage slots for holding the media, at least one storage drive for reading data from and writing data to the media, a destage slot, the destage slot being a storage slot physically closest to the drive, a prestage slot, and a picker for moving the media among the slots and the drive, the method comprising the steps of:

moving a first medium from the drive to the destage slot, the first medium being the medium that was last accessed by the drive;

moving a second medium from the prestage slot to the drive, the second medium being the medium that will be accessed next by the drive after the first medium; and during operation of the drive on the second medium, returning the first medium from the destage slot to the slot originally holding the first medium, the returning step includes moving a third medium from a respective storage slot to the prestage slot, the third medium being the medium that will be accessed next by the drive, after the second medium.

2. The method as recited in claim 1, further comprising the step of positioning the picker close to the drive after the picker returns the first medium.

3. The method as recited in claim 1, wherein the method is operable responsive to a request for access to the second medium.

4. The method as recited in claim 1, wherein during the step of returning the first medium, the first medium is returned to the storage slot previously occupied by the second medium.

5. The method as recited in claim 1, wherein the media storage slots that are physically the first and second closest to the drive are used as the destage slot and the prestage slot, respectively.

6. The method as recited in claim 1, wherein:

the step of moving a third medium to the prestage slot is performed before the step of returning the first medium from the destage slot; and the step of returning the first medium includes the step of moving the first medium from the destage slot to the storage slot previously occupied by the third medium.

7. The method as recited in claim 1, wherein the method steps are repeated as long as there are still requests to access the data media of the storage library.

8. A computer program product for use with a storage library for destaging and prestaging media in the library, the library having a plurality of removable data media, a plurality of storage slots for holding the media, at least one storage drive for reading data from and writing data to the media, a destage slot, the destage slot being a storage slot physically closest to the drive, a prestage slot, and a picker for moving the media among the slots and the drive, the computer program product comprising:

a computer-readable medium;

means, provided on the computer-readable medium, for directing the library to move a first medium from the drive to the destage slot, the first medium being the medium that was last accessed by the drive;

means, provided on the computer-readable medium, for directing the library to move a second medium from the prestage slot to the drive, the second medium being the medium that will be accessed next by the drive after the first medium; and means, provided on the computer-readable medium, for directing the library to return the first medium from the destage slot to the slot originally holding the first medium, during operation of the drive on the second medium, the means for directing to return includes means for directing the library to move a third medium from a respective storage slot to the prestage slot, the third medium being the medium that will be accessed next by the drive, after the second medium.

9. The computer program product as recited in claim 8 further comprising means, provided on the computer-readable medium, for directing the library to position the picker close to the drive.

10. The computer program product as recited in claim 8, wherein the means for directing the library to return the first medium includes means, provided on the computer-readable medium, for directing the library to return the first medium to the storage slot previously occupied by the second medium.

11. The computer program product as recited in claim 8, wherein the media storage slots that are physically the first and second closest to the drive are used as the destage slot and the prestage slot, respectively.

12. The computer program product as recited in claim 8, wherein:

the means for directing the library to move a third medium to the prestage slot operates before the means for directing the library to return the first medium from the destage slot; and the means for directing the library to return the first medium includes means, provided on the computer-readable medium, for directing the library to move the first medium from the destage slot to the slot previously occupied by the third medium.

13. The computer program product as recited in claim 8 further comprising means, provided on the computer-readable medium, for directing the library to repeat the operation of the picker and the drive as long as there are still requests to access the data media of the library.

14. A data storage library system comprising:

a plurality of removable data media;

a plurality of storage slots for holding the media;

at least one storage drive for reading data from and writing data to the media;

a prestage slot for holding a medium to be accessed next by the drive;

a destage slot, the destage slot being a storage slot physically closest to the drive; and a picker for moving the media among the slots and the drive, the destage slot holding a first medium while the picker is moving a second medium from the prestage slot to the drive and moving a third medium from a respective storage slot to the prestage slot, the first medium being one that was last accessed by the drive, the second medium being the medium that will be accessed next by the drive after the first medium, and the third medium being one that will be accessed next by the drive after the second medium.

15. The system as recited in claim 14, wherein the media storage slots that are physically the first and second closest to the drive are used as the destage slot and the prestage slot, respectively.

16. The system as recited in claim 14, wherein the picker continues to move the data media between the storage slots and the drive, using the destage and prestage slots, as long as there are still pending requests to access the data media.

* * * * *